United States Patent [19]

Barry

[11] 4,194,811
[45] Mar. 25, 1980

[54] REMOTELY CONTROLLED ELECTROMAGNETIC OPTICAL FOCUSING ASSEMBLY

[75] Inventor: James D. Barry, Los Angeles, Calif.

[73] Assignee: The United States of America as represented by the Secretary of the Air Force, Washington, D.C.

[21] Appl. No.: 902,523

[22] Filed: May 3, 1978

[51] Int. Cl.² .................................................. G02B 7/04
[52] U.S. Cl. ................................................... 350/255
[58] Field of Search .......................... 350/46, 47, 255; 250/201

[56] References Cited

U.S. PATENT DOCUMENTS

| 1,866,581 | 7/1932 | Simjian | 350/255 X |
| 3,062,100 | 11/1962 | Ludewig et al. | 350/255 X |
| 3,917,394 | 11/1975 | Sturdevant | 350/255 X |
| 4,021,101 | 5/1977 | Camerik | 350/255 |
| 4,092,529 | 5/1978 | Aihara et al. | 250/201 |
| 4,135,206 | 1/1979 | Kleuters et al. | 250/201 X |

FOREIGN PATENT DOCUMENTS 1131093  10/1956  France .................................... 350/255

Primary Examiner—F. L. Evans
Attorney, Agent, or Firm—Joseph E. Rusz; Arsen Tashjian

[57] ABSTRACT

A lens of an optical system in space is to be moved, and thereby be focused, resulting in the focusing of the system. The lens is mounted, in a diaphragm of resilient material, with a ring-like component made of magnetic material. An electromagnet is positioned on either side of the lens and of the ring-like component. Application of d.c. current, by remote control, through the electromagnets, causes the translational movement, and the necessary focusing, of the lens and, therefore, of the optical system.

2 Claims, 2 Drawing Figures

REMOTELY CONTROLLED ELECTROMAGNETIC OPTICAL FOCUSING ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the optical art and, more particularly, to the movement and focusing, by remote control, of a lens (or lens group) in an optical system.

It is well known that a remotely located optical system, such as one that is in orbit in space, may require focusing or refocusing from time to time, such as after launch into space.

It is also well known that the focusing of an optical system may be generally achieved by a slight movement of a single lens (or lens group) within the system. In fact, movement of the optical lens (or lens group) involved for only ±0.015 inch, from the null position, is normally sufficient.

It is equally well known that the movement usually involved is a translational motion (i.e., uniform motion in a straight line).

Therefore, experience and research establish that what is needed in the art, and is not presently available, is an apparatus which can easily and quickly: (a) focus or refocus the optical lens (or lens group) involved from its null position; (b) do so by remote control; (c) do so by translational motion of the lens (or lens group) involved; and, (d) permit the "fail safe" return of the lens (or lens group) to the null position, so that subsequent focusing and refocusing of the lens (or lens group) may be accomplished.

I have invented such an apparatus and, thereby, have significantly advanced the state-of-the-art.

SUMMARY OF THE INVENTION

The principal object of my invention is to provide an apparatus (which I refer to as an "assembly") that permits the focusing and/or refocusing of an optical lens (or lens group) in a far (i.e., distant) location by remote control, by translational motion of the lens (or lens group) from the null position; and, that also permits the safe return, without fail, of the affected lens (or lens group) to the null position.

This object, as well as other related objects, of this invention will become readily apparent after a consideration of the description of the invention, together with reference to the Figures of the drawing.

DESCRIPTION OF THE PREFERRED EMBODIMENT

Figure 1:
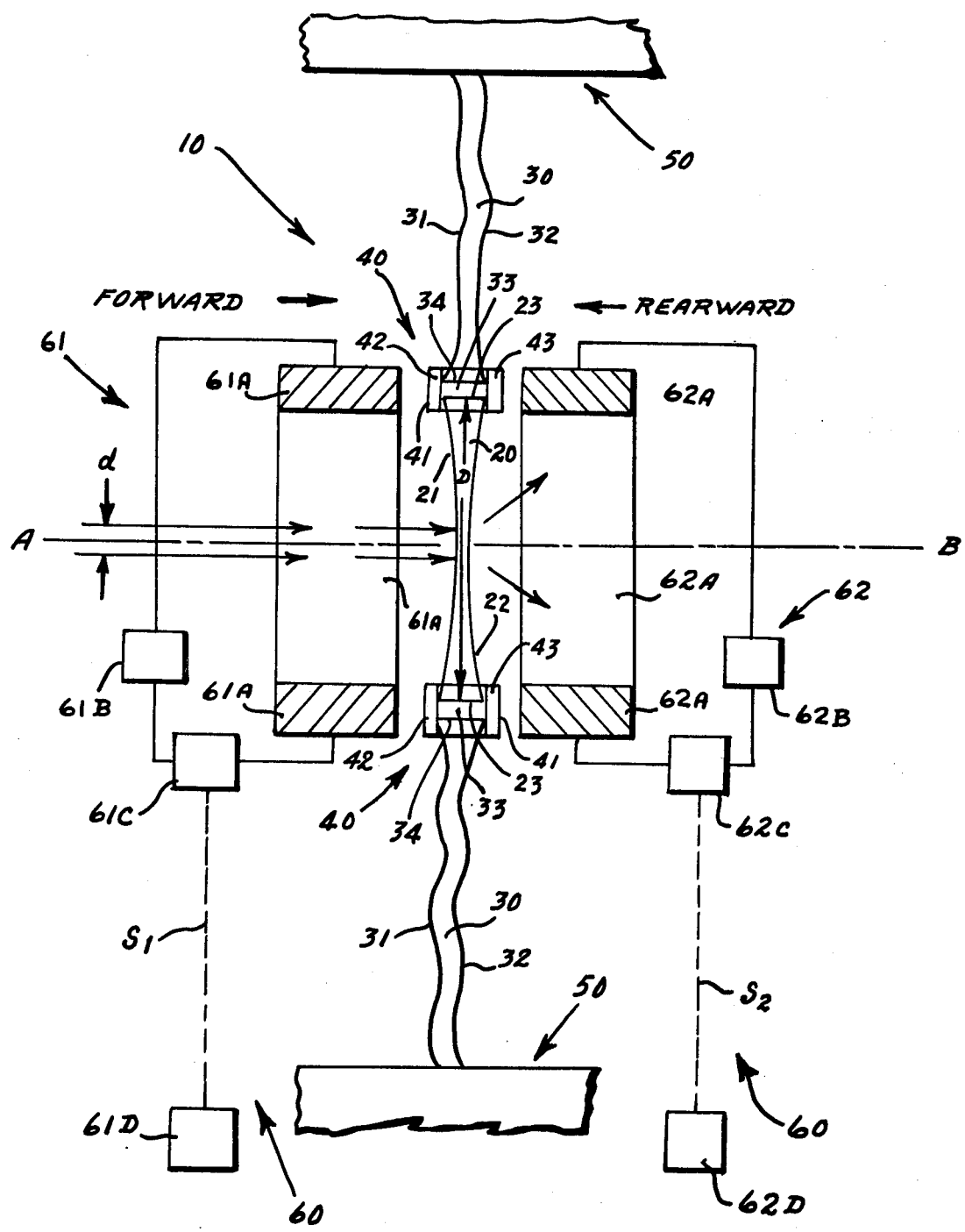
FIG. 1 is a side elevation view, in simplified schematic form, partically fragmented, partially in cross section of a preferred embodiment of my invention in its working environment.
Figure 2:
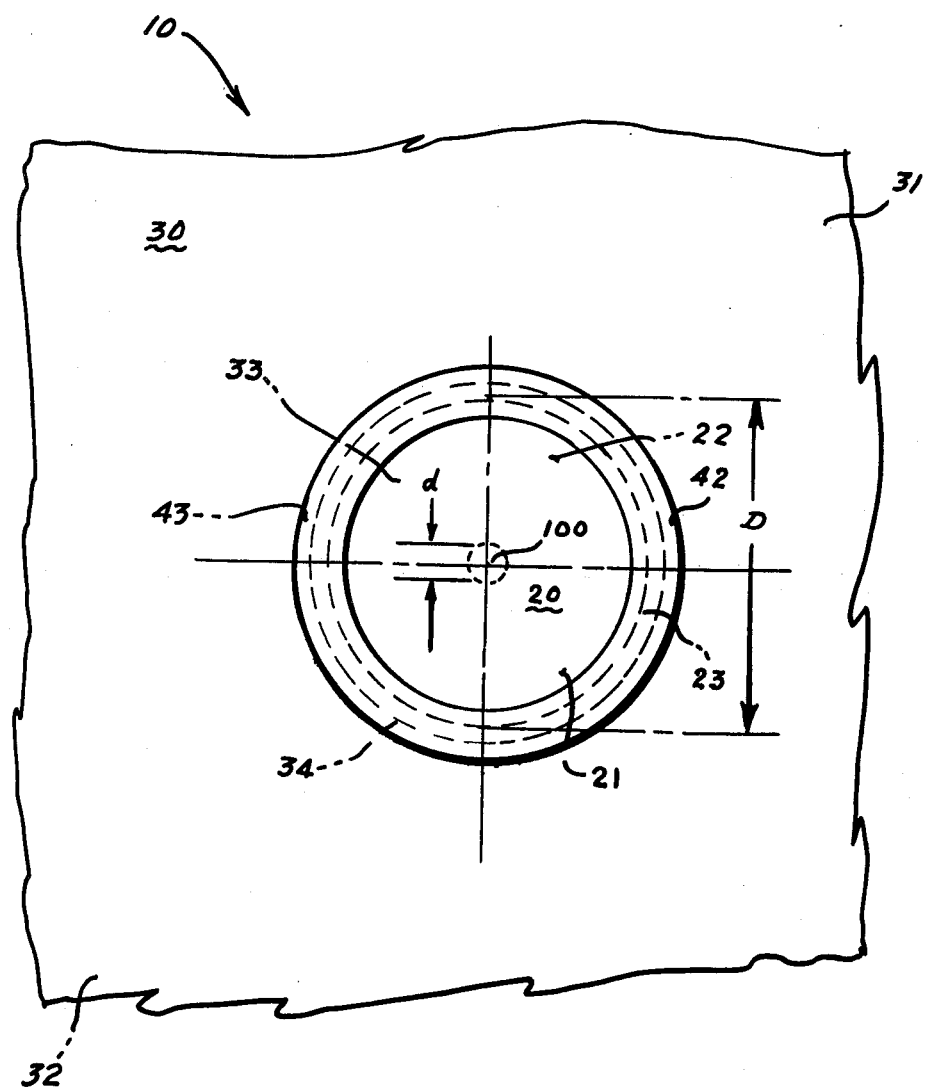
FIG. 2 is a front view, in simplified schematic form and partially fragmented, of the lens, diaphragm and some other components of the preferred embodiment of my invention.

With reference to FIGS. 1 and 2 of the drawings, wherein the same component has the same reference numeral and/or character, therein is shown, in simplified form and in two views, the preferred embodiment 10 of my invention, a remotely controlled focusing assembly, adapted for use with a collimated light beam 100 having a preselected diameter "d".

In its most basic and generic structural form, the preferred embodiment 10 of my remotely controllable electromagnetic optical (lens) focusing (i.e., positioning) assembly comprises: (a) a lens 20 having a first side 21, a second side 22, a circumference 23, a diameter "D" that is more than three times larger (i.e., longer) than the diameter "d" of the light beam 100, and an optical (i.e., longitudinal) axis "A-B", and with the lens 20 disposed both in optical and in geometric alignment with the light beam 100; (b) a diaphragm 30 that is made of opaque resilient material, and that has a first side 31, a second side 32, and a circular aperture 33 with a circumference 34 adjacent to, and encircling, the circumference 23 of the lens 20; (c) means, generally designated 40, for interconnecting the diaphragm 30 and the lens 30; (d) means, generally designated 50, for supporting the diaphragm 30, the lens 20, and the diaphragm-and-lens interconnecting means 40; and, (e) means, generally designated 60, for remotely and selectively causing a translational movement (i.e., motion) of the lens 20 in a predetermined direction.

More specifically, and as a matter of preference, the means 40 for interconnecting the diaphragm 30 and the lens 20 includes a ring or a ring-like component 41 that is made of magnetic material. Preferably, the component 41 is ring-like, and includes: (a) a first metallic circular strip 42 that is connected, by suitable means, to a portion of the first side 21 of the lens 20, and is also connected, by suitable means, to a portion of the first side 31 of the diaphragm 30, and thereby covers the circumference 34 of the aperture 33 of the diaphragm 30, and also covers the circumference 23 of the lens 20; and, (b) a second metallic circular strip 43 that is connected, by suitable means, to a portion of the second side 22 of the lens 20, and is also connected, by suitable means, to a portion of the second side 32 of the diaphragm 30, with this second metallic circular strip 43 positioned in registration with the first metallic circular strip 42, and thereby also covering the circumference 34 of the aperture 33 of the diaphragm 30 and the circumference 23 of the lens 20.

The means 50 for supporting the diaphragm 30, the lens 20, and the diaphragm-and-lens interconnecting means 40 may comprise any suitable conventional means usable for that purpose. In other words, none is preferred over another.

The means 60 for remotely and selectively causing a translational movement (i.e., motion) of the lens 20 in a predetermined direction (such as is indicated by the arrows, and by the directional designations "Forward" and "Rearward", in FIG. 1) preferably includes a first electromagnetic means 61 and a second electromagnetic means 62. More specifically, the first electromagnetic means 61 further includes: (a) a first ring-shaped core 61A that is positioned forward of, in equal spaced relationship to, and in registration with the first metallic circular strip 42; (b) a first electrical power supply source 61B of direct current that is in electrical connection with and to the first ring-shaped core 61A; (c) a first switching means 61C interposed between, and connected to, the first electrical power supply source 61B and to the first ring-shaped core 61A, with this switching means 61C capable of being activated (e.g., closed, actuated, energized or the like) and deactivated (e.g., opened, deactivated, or the like) by remote control by a first signal "S1"; and (d) means 61D for selectively emitting that first signal "S1". The second electromagnetic means 62 further includes: (a) a second ring-shaped core 62A positioned rearward of, in equal spaced relationship to, and in registration with the second metallic circular strip 43; (b) a second electrical power supply source 62B of direct current that is in electrical connection with and to the second ring-shaped core 43; (c) a second switching means 62C interposed between, and connected to, the second electrical supply source 62B and to the second ring-shaped core 62A, with this switching means 62C capable of being activated and deactivated by remote control by a second signal "S2"; and (d) means 62D for selectively emitting that second signal "S2".

MANNER OF OPERATION OF THE PREFERRED EMBODIMENT

The manner of operation of the preferred embodiment 10 of my invention can be easily ascertained by any person of ordinary skill in the art from the foregoing description, coupled with reference to the two Figures of the drawing.

For others, it is stated that, essence, translational motion of the lens 20 along optical axis A-B (i.e., focusing) is achieved forwardly (to the reader's right) or rearwardly (to the reader's left), as needed, by application of d.c. electric current from the electrical power supply sources 61B and 62B to the ring-shaped cores 61A and 62B of the electromagnetic means 61 and 62, by emitting signals S-1 and S-2 to switches 61C and 62C and the resultant activation of these switches.

The following is an explanation in greater detail. Lens 20 is held (in its null position, FIG. 1) about its circumference 23 by first and second magnetic circular strips 42 and 43 (i.e., magnetic ring-like component 41) which have a magnetic pole moment, let us assume, in the forwardly (right) direction. That is, the magnetic north pole is in the forwardly direction (to the reader's right), and the magnetic south pole is in the rearwardly direction (to the reader's left). Now, for example, if the translational motion of lens 20 is desired or is needed in the forwardly direction (to the right), then by application of d.c. electric current, electromagnetic core 62A is made to have a magnetic south pole opposite the magnetic north pole of magnetized strip 43, and electromagnetic core 61A is made to have a magnetic south pole opposite the magnetic south pole of magnetized strip 43. Thereby, strips 42 and 43 (together with lens 20) are attracted toward core 62A and are repelled away from core 61A, resulting in translational movement of lens 20 to the right. Return of the lens 20 to the null position, FIG. 1, is accomplished simplly by stopping the emission of signals S1 and S2, thereby "turning off" the current. Similarly, if the translational movement of the lens 20 is desired or needed rearwardly (to the left), the d.c. current is "turned on", and its direction is reversed.

CONCLUSION

It is abundantly clear from all of the foregoing, and from the Figures of the drawing, that the stated and desired principle object of the invention, as well as other related objects of the invention, has been achieved.

It is to be noted that although there have been described the fundamental and unique features of my invention as applied to a referred embodiment, various other embodiments, variations, adaptations, substitutions, additions, omissions, and the like may occur to, and can be made by, those of ordinary skill in the art, without departing from the spirit of the invention.

What is claimed is:

1. A remotely controlled electromagnetic optical focusing assembly, adapted for use with a collimated light beam having a preselected diameter, comprising:
   a. a lens having a first side, a second side, a circumference, and a diameter in excess of three times larger than the diameter of said light beam, wherein said lens is disposed in optical and also in geometric alignment with said light beam;
   b. a diaphragm made of opaque resilient material and having a first side, a second side, and a circular aperture with a circumference adjacent to and encircling said circumference of said lens;
   c. magnetic means for interconnecting said diaphragm and said lens, wherein this means includes a ring-like component made of magnetic material interconnecting said diaphragm and said lens which further includes:
      (1) a first metallic circular strip connected to a portion of said first side of said lens, and also connected to a portion of said first side of said diaphragm, thereby covering said circumference of said aperture of said diaphragm, and also covering said circumference of said lens;
      (2) and, a second metallic circular strip connected to a portion of said second side of said lens, and also connected to a portion of said second side of said diaphragm, with said second metallic circular strip in registration with said first metallic circular strip;
   d. means for supporting said diaphragm, said lens, and said interconnecting means;
   e. and, means for remotely and selectively causing a translational movement of said lens in a predetermined direction.

2. An electromagnetic focusing assembly, as set forth in claim 1, wherein said means for remotely and selectively causing a translational movement of said lens in a predetermined direction includes:
   a. a first electromagnetic means which further includes:
      (1) a first ring-shaped core positioned forward of, in equal spaced relationship to, and in registration with said first metallic circular strip;
      (2) a first electrical power supply source of direct current connected to said first ring-shaped core;
      (3) a first switching means interposed between and connected to said first electrical power supply source and to said first ring-shaped core, wherein said first switching means may be activated and deactivated by remote control by a first signal;
      (4) and, means for selectively emitting said first signal;
   b. and, a second electromagnetic means which further includes:
      (1) a second ring-shaped core positioned rearward of, in equal spaced relationship to, and in registration with said second metallic circular strip;

(2) a second electrical power supply source of direct current connected to said second ring-shaped core;
(3) a second switching means interposed between and connected to said second electrical power supply source and to said second ring-shaped core, wherein said second switching means may be activated and deactivated by remote control by a second signal;
(4) and, means for selectively emitting said second signal.

* * * * *